United States Patent [19]

Kodera et al.

[11] Patent Number: 4,610,214
[45] Date of Patent: Sep. 9, 1986

[54] ROTATION CONTROL SYSTEM FOR Z-TYPE PROPULSION APPARATUS

[75] Inventors: Masanori Kodera, Chigasaki; Yasuo Aizawa, Hiratsuka; Kohji Ichijo, Tokyo, all of Japan

[73] Assignee: Niigata Engineering Co., Ltd., Japan

[21] Appl. No.: 682,012

[22] PCT Filed: Mar. 30, 1984

[86] PCT No.: PCT/JP84/00157

§ 371 Date: Nov. 26, 1984

§ 102(e) Date: Nov. 26, 1984

[87] PCT Pub. No.: WO84/03870

PCT Pub. Date: Oct. 11, 1984

[30] Foreign Application Priority Data

Mar. 30, 1983 [JP] Japan .............................. 58-46138[U]
Mar. 30, 1983 [JP] Japan .............................. 58-46139[U]
May 31, 1983 [JP] Japan .............................. 58-82605[U]
May 31, 1983 [JP] Japan .............................. 58-82606[U]
May 31, 1983 [JP] Japan .............................. 58-82607[U]

[51] Int. Cl.[4] .............................................. B63H 5/14
[52] U.S. Cl. .............................. 114/144 E; 74/480 B
[58] Field of Search ........................ 114/144 E, 144 R; 318/628; 364/102; 340/146.1 BE; 74/480 R, 480 B

[56] References Cited

U.S. PATENT DOCUMENTS 4,074,648 2/1978 Reid et al. .................. 114/144 E
4,301,759 11/1981 de Vries ...................... 114/144 E

FOREIGN PATENT DOCUMENTS 46-42733 12/1971 Japan ................. 114/144 E
54-72895 6/1979 Japan ................. 114/144 E Primary Examiner—Trygve M. Blix
Assistant Examiner—Stephen P. Avila
Attorney, Agent, or Firm—Scully, Scott, Murphy & Presser

[57] ABSTRACT

There is provided a system for controlling the rotation of a rotary housing mounting a propeller unit of a Z-type propulsion apparatus in which the rotary housing does not rotate in the direction opposite to that of rotation of a steering handle even when the steering handle for commanding the rotary housing to rotate is angularly moved by more than ±180°. A vector calculation circuit either produces a sinusoidal signal representative of a sine of the difference of angle between the steering angle of the steering handle and the follow-up angle of the rotary housing and a cosine signal representative of a cosine of the difference of angle or produces the sinusoidal and cosine signals and a second sinusoidal signal representative of an angle obtained by adding 45° to the difference of angle. And a signal processing circuit produces, in accordance with either the first and second sinusoidal signals and cosine signal or the first sinusoidal and cosine signals, a signal whose polarity is not reversed even when the steering angle exceeds ±180°. The signal produced by the signal processing circuit is supplied to a drive unit for rotating the rotary housing to thereby control the rotation of the rotary housing.

12 Claims, 12 Drawing Figures

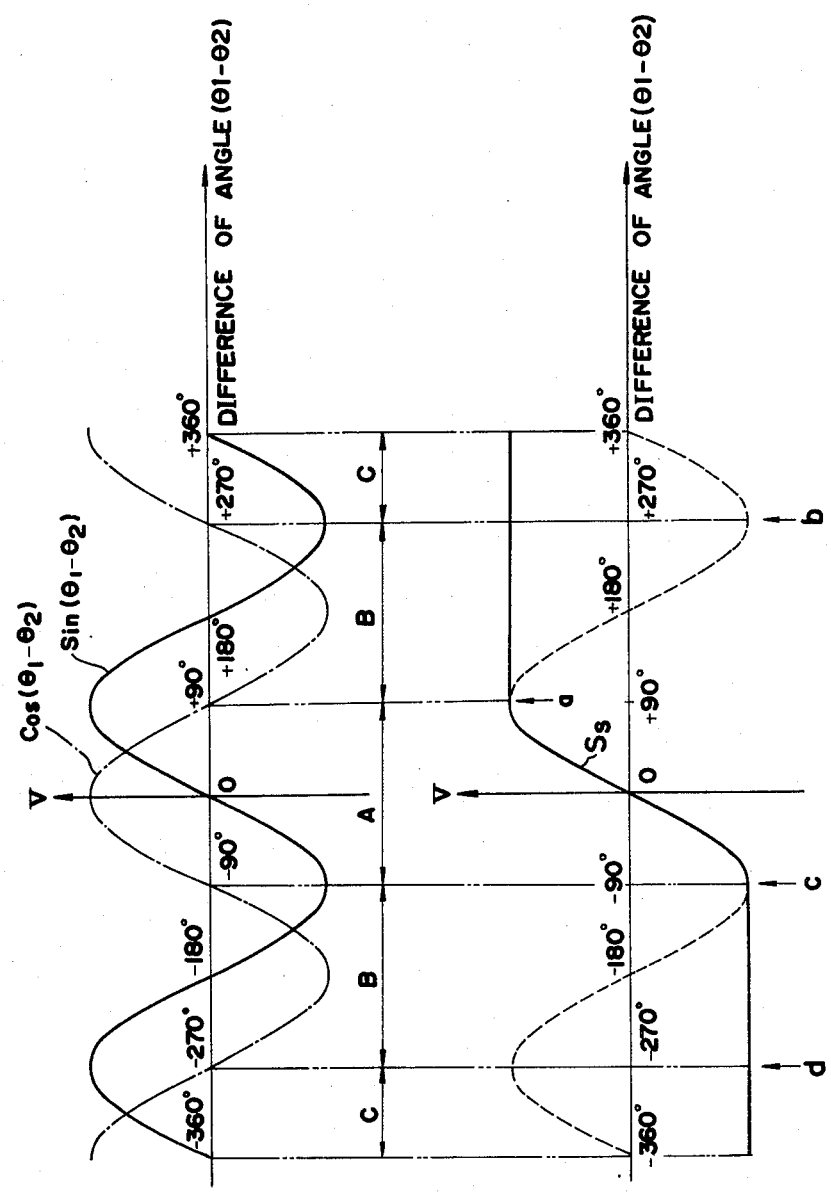

ROTATION CONTROL SYSTEM FOR Z-TYPE PROPULSION APPARATUS

FIELD OF THE INVENTION

This invention relates to a rotation control system for a Z-type propulsion apparatus for a watercraft such as a tug boat.

BACKGROUND ART

In recent years, harbors have become much crowded with vessels of a large size. Therefore, it has been required that tug boats should operate to move the vessel toward and away from the shore in a safe and rapid manner. For this reason, there have now been extensively used tug boats equipped with a Z-type propulsion apparatus which can easily vary the direction of propulsion over the range of 360 degrees. There has been proposed a rotation control system for controlling the rotation of a rotary housing mounting a propeller unit of such a Z-type propulsion apparatus which comprises a steering handle for commanding the rotary housing to rotate by a desired amount of angle. The steering handle is provided with a potentiometer for detecting the angular movement thereof (steering angle $\theta1$). There is provided in the system another potentiometer for detecting the angular movement of the rotary housing (follow-up angle $\theta2$). And a vector calculation circuit is provided for outputting a sinusoidal signal $\sin(\theta1-\theta2)$ to a servo-control circuit, the signal $\sin(\theta1-\theta2)$ representing a sine of the difference of angle between the steering angle $\theta1$ and the follow-up angle $\theta2$. The servo control circuit produces a servo signal from the sinusoidal signal $\sin(\theta1-\theta2)$ and feeds it to a servomotor which in turn controls a hydraulic circuit in accordance with its rotational movement. The hydraulic circuit controls a hydraulic motor, and the hydraulic motor rotates the rotary housing via a gear mechanism.

With the construction of the above-described conventional system however, the rotary housing rotates in the opposite direction to that of rotation of the steering handle when the difference of angle ($\theta1-\theta2$) exceeds 180°, since the sinusoidal signal $\sin(\theta1-\theta2)$, whose polarity is reversed when the difference of angle ($\theta1-\theta2$) exceeds 180°, is directly inputted to the servo control circuit. As shown in FIG. 2, when the steering handle is operated in such a manner that the steering angle $\theta1$ is abruptly varied from 0° to 180° clockwise, the rotary housing rotates not clockwise but counterclockwise by the follow-up angle $\theta2$, as indicated by a broken line in the same figure. As a result, the tug boat mounting this system turns in the opposite direction, i.e., counterclockwise. As is described above, the conventional system has a deficiency that the rotary housing rotates in the opposite direction when the difference of angle ($\theta1-\theta2$) exceeds 180°.

It is therefore an object of the present invention to provide a rotation control system for controlling the rotation of a rotary housing mounting a propeller unit of a Z-type propulsion apparatus in which the rotary housing can be rotated in the selected direction even when the rotary housing is commanded to rotate by more than 180°, thereby a safe and good steerability being obtained.

It is another object of the invention to provide such a system which is simple in construction and can be manufactured at lower costs.

DISCLOSURE OF THE INVENTION

According to one aspect of the present invention, there is provided a rotation control system for controlling the rotation of a rotary housing mounting a propeller unit of a Z-type propulsion apparatus comprising a steering angle detector for detecting as a steering angle an angular position of a steering handle for commanding the rotary housing to rotate; a follow-up angle detector for detecting as a follow-up angle an angular position of the rotary housing; a vector calculation circuit responsive to outputs of the steering angle detector and the follow-up angle detector for outputting a first sinusoidal signal representative of a sine of the difference of angle between the steering angle of the steering handle and the follow-up angle of the rotary housing, a cosine signal representative of a cosine of the difference of angle, and a second sinusoidal signal representative of a sine of an angle obtained by adding +45° to the difference of angle; a signal processing circuit responsive to the first and second sinusoidal signals and cosine signal for outputting a positive constant value when the difference of angle, which varies within −360° and +360°, is greater than +180° and when the second sinusoidal signal is negative, the signal processing circuit outputting a negative constant value when the difference of angle is less than −180° and when the second sinusoidal signal is negative, the signal processing circuit outputting the first sinusoidal signal when the difference of angle is between −180° and +180° or when the second sinusoidal signal is greater than or equal to 0; and a drive unit responsive to output of the signal processing circuit for rotating the rotary housing.

According to another aspect of the present invention, there is provided a rotation control system for controlling the rotation of a rotary housing mounting a propeller unit of a Z-type propulsion apparatus comprising: a steering angle detector for detecting as a steering angle an angular position of a steering handle for commanding the rotary housing to rotate; a follow-up angle detector for detecting as a follow-up angle an angular position of the rotary housing; a vector calculation circuit responsive to outputs of the steering angle and follow-up angle detectors for outputting a sinusoidal signal representative of a sine of the difference of angle between the steering angle of the steering handle and the follow-up angle of the rotary housing and a cosine signal representative of a cosine of the difference of angle; a signal processing circuit responsive to the sinusoidal and cosine signals for outputting the sinusoidal signal when the cosine signal is greater than a predetermined value, the signal processing circuit outputting a positive constant value when the difference of angle is positive and when the cosine signal is less than the predetermined value, the signal processing circuit outputting a negative constant value when the difference of angle is negative and when the cosine signal is less than the predetermined value; and drive unit responsive to output of the signal processing circuit for rotating the rotary housing. In this system, the signal processing circuit may be constructed so that it holds and outputs the value of the sinusoidal signal obtained at the time when the cosine signal becomes less than the predetermined value if the cosine signal is less than the predetermined value. And in this system, the signal processing circuit may further comprise a circuit for comparing the value of the sinusoidal signal held by itself with the sinusoidal signal outputted from the vector calculation circuit to release the holding of the value of the sinusoidal signal when the polarity of the value and the polarity of the sinusoidal signal outputted from the vector calculation circuit coincide with each other and when the cosine signal becomes greater than the predetermined value. Alternatively, the signal processing circuit may further comprises a circuit for comparing the value of the sinusoidal signal held by itself with the sinusoidal signal outputted from the vector calculation circuit to release the holding of the value of the sinusoidal signal when the cosine signal becomes greater than the predetermined value and when the difference between the value held by itself and the sinusoidal signal outputted from the vector calculating circuit is less than a second predetermined value.

According to a further aspect of the present invention, there is provided a rotation control system in which the signal processing circuit comprises a counter circuit for performing one of incremental and decremental counting operations which is identical to the preceding counting operation each time the polarity of the cosine signal is changed and when the polarity of the sinusoidal signal at the time of changing of the polarity of the cosine signal is different from the polarity of the sinusoidal signal at the time of the preceding changing of the polarity of the cosine signal, the initial count value of the incremental and decremental counting operations being 0, the counter circuit performing one of the incremental and decremental counting operations which is of the different kind from that of the preceding counting operation each time the polarity of the cosine signal is changed and when the polarity of the sinusoidal signal at the time of changing of the polarity of the cosine signal is identical to the polarity of the sinusoidal signal at the time of the preceding changing of the polarity of the cosine signal; and a signal hold circuit for outputting the sinusoidal signal to the drive unit when the count value outputted from the counter circuit is 0, the signal hold circuit holding and outputting the value of the sinusoidal signal obtained at the moment when the count value becomes other than 0 if the count value is other than 0. And in the systems provided in accordance with the present invention, the steering angle detector and the follow-up angle detector may comprise potentiometers.

BRIEF DESCRIPTION OF THE DRAWINGS

FIG. 12 is an illustration showing the waveforms for explaining the operations of the embodiments shown in FIGS. 9 to 11.

DESCRIPTION OF THE PREFERRED EMBODIMENTS OF THE INVENTION

Figure 1:
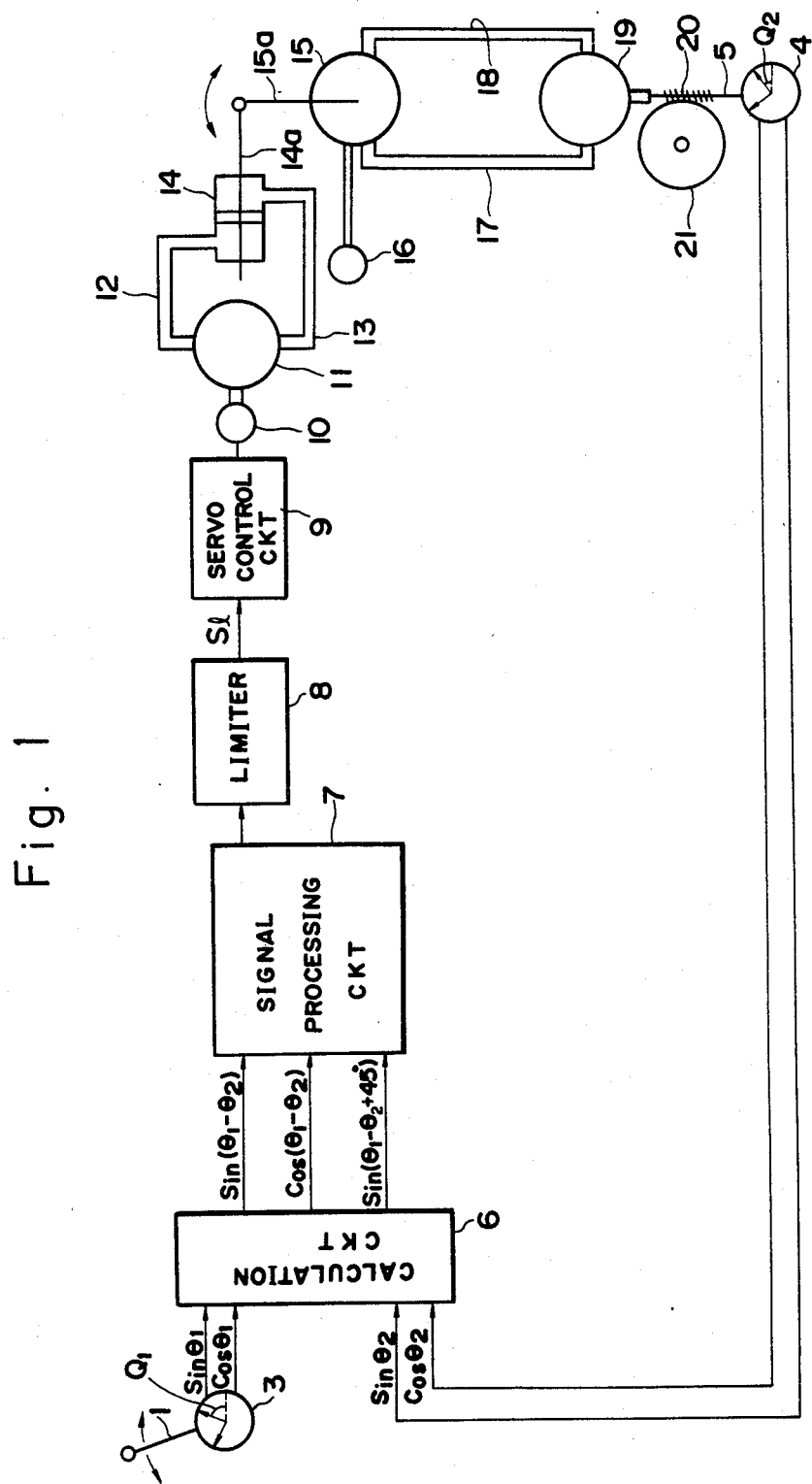
FIG. 1 is a block diagram showing the construction of the first embodiment of the present invention.
Figure 2:
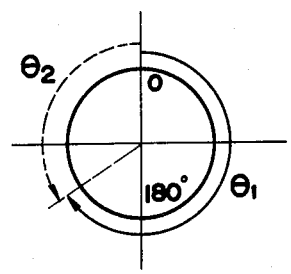
FIG. 2 is an illustration for explaining the relationship between the steering angle and the follow-up angle in the conventional system.
Figure 3:
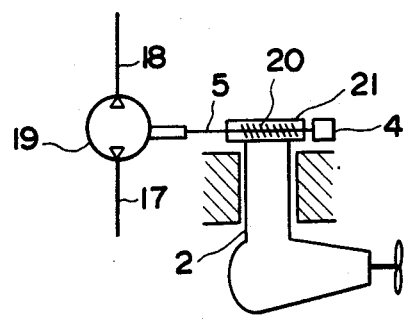
FIG. 3 is a diagrammatical illustration of the rotary housing of the embodiment shown in FIG. 1.
Figure 5:
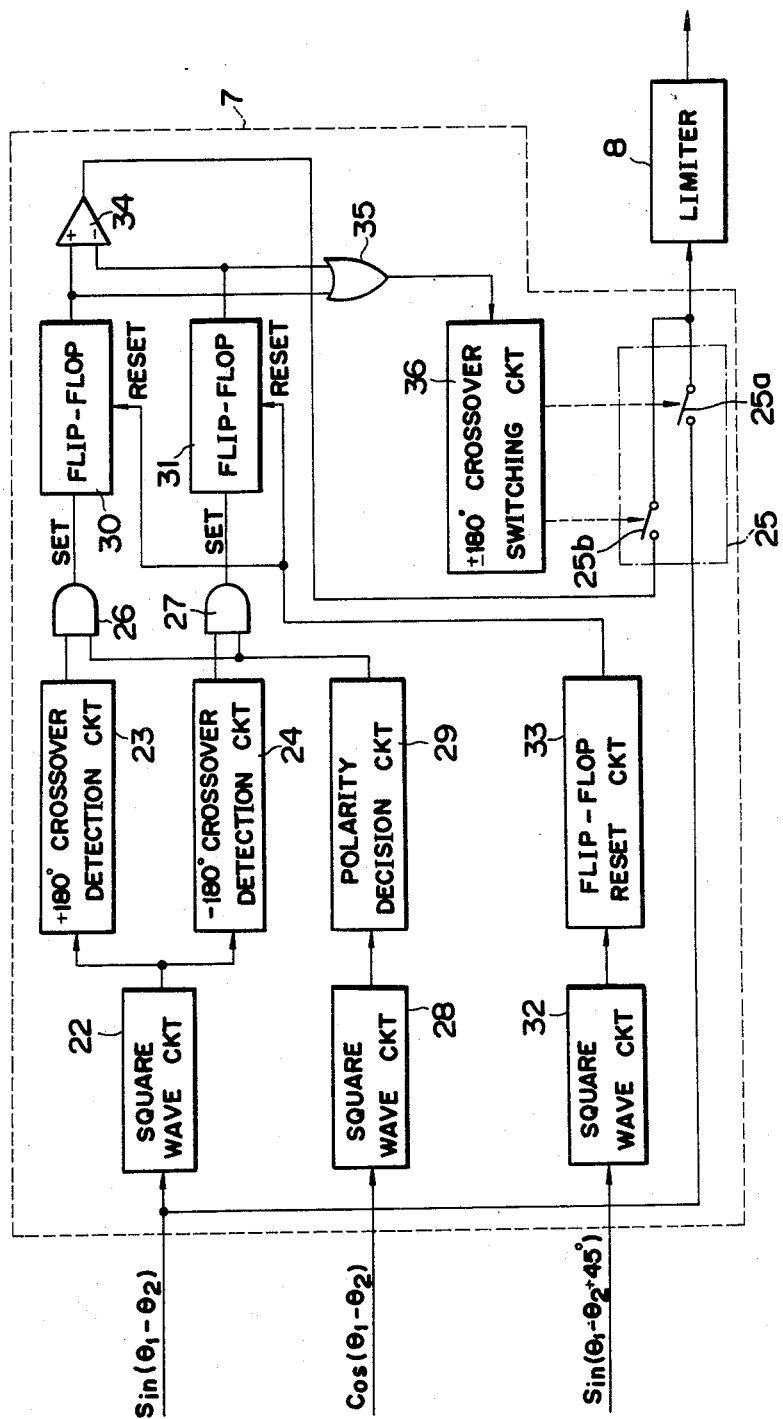
FIG. 5 is a circuit diagram showing in detail the signal processing circuit of the embodiment shown in FIG. 1.

FIGS. 1, 3 and 5 show a system for controlling the rotation of a rotary housing mounting a propeller unit of a Z-type propulsion apparatus according to the present invention. In the figures, reference numeral 1 denotes a steering handle for commanding a rotary housing 2 mounting a propeller unit of a Z-type propulsion apparatus to rotate, the rotary housing 2 being rotatably mounted on a hull. The steering handle 1 is connected to an angular position detector 3 comprising a well-known potentiometer or the like which outputs a sinusoidal voltage sin $\theta_1$ and a cosine voltage cos $\theta_1$ in accordance with the angular position $\theta_1$ (steering angle) of the steering handle 1. Another angular position detector 4 such as a potentiometer is connected to a worm shaft 5 through a gear mechanism, the potentiometer outputting a sinusoidal voltage sin $\theta_2$ and a cosine voltage cos $\theta_2$ (follow-up angle) in accordance with the angular position $\theta_2$ of the rotary housing 2. The output voltages sin $\theta_1$ and cos $\theta_1$ of the angular position detector 3 and the output voltages sin $\theta_2$ and cos $\theta_2$ of the angular position detector 4 are inputted to the calculation circuit 6 (vector calculation circuit). The calculation circuit 6 produces a first sinusoidal signal $\sin(\theta_1 - \theta_2)$ and a cosine signal $\cos(\theta_1 - \theta_2)$ of an angle $(\theta_1 - \theta_2)$ representative of the difference of angle between the steering angle $\theta_1$ and the follow-up angle $\theta_2$, and also produces a second sinusoidal signal $\sin(\theta_1 - \theta_2 + 45°)$ of an angle $(\theta_1 - \theta_2 + 45°)$ which is obtained by adding 45° to the difference of angle $(\theta_1 - \theta_2)$. These signals $\sin(\theta_1 - \theta_2)$, $\cos(\theta_1 - \theta_2)$ and $\sin(\theta_1 - \theta_2 + 45°)$ are inputted to a signal processing circuit 7.

Figure 4:
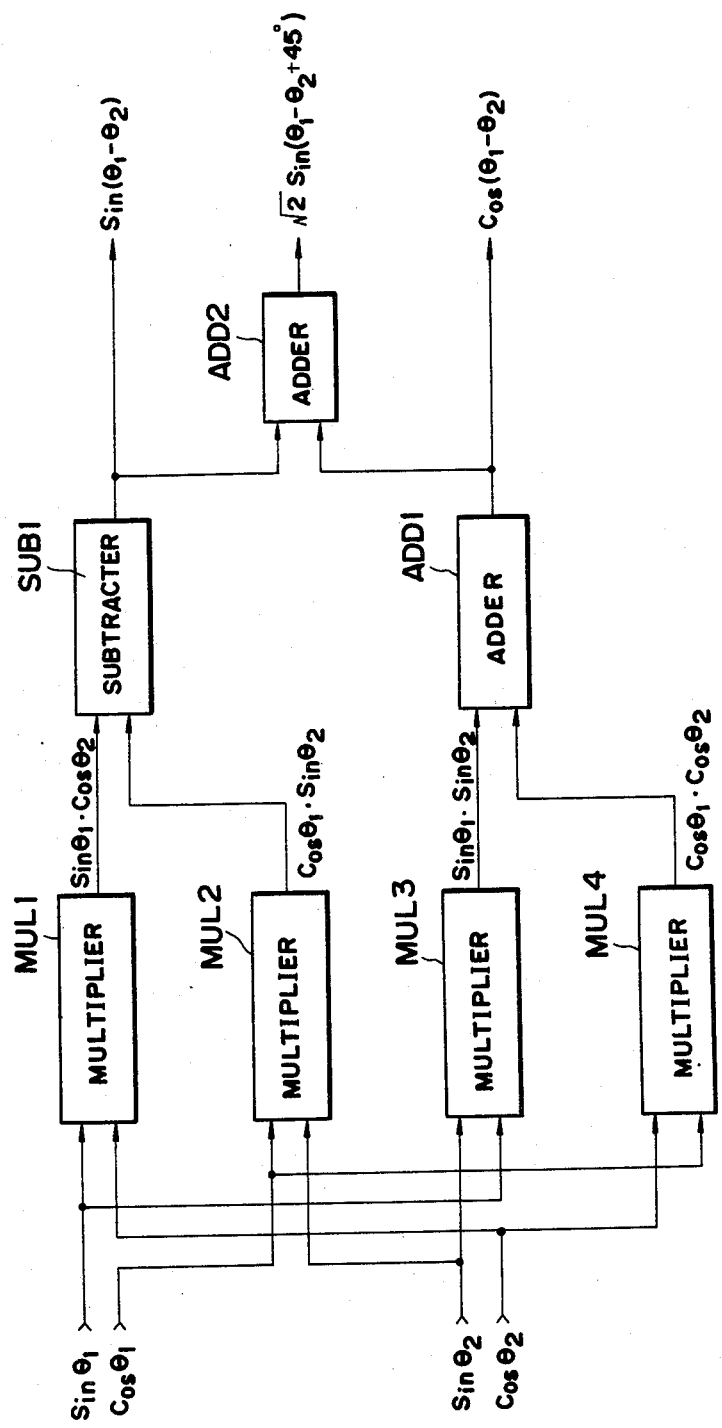
FIG. 4 is a circuit diagram showing in detail the calculation circuit of the embodiment shown in FIG. 1.

As shown in FIG. 4, the calculation circuit 6 comprises multipliers MUL1 to MUL4, a subtracter SUB1 and adders ADD1 and ADD2. These operational devices may be constituted of analog circuits including operational amplifiers or of digital circuits including a microprocessor. The signal processing circuit 7 is connected to a limiter 8, and this limiter 8 is connected to a servo control circuit 9 for controlling a servomotor 10.

The servomotor 10 is connected to a hydraulic pump 11 which is coupled to a hydraulic cylinder 14 through connecting tubes 12 and 13. The piston 14a of the hydraulic cylinder 14 is linked to a control lever 15a of a hydraulic pump 15 to control the direction and amount of the oil passing therethrough, the hydraulic pump 15 being connected to an electric motor 16. The hydraulic pump 15 is coupled through connecting tubes 17 and 18 to a hydraulic motor 19 which is linked to a worm wheel 21 through a worm 20 formed on a shaft 5, and the worm wheel 21 is connected to the rotary housing 2.

The sinusoidal signal $\sin(\theta_1 - \theta_2)$ inputted to the signal processing circuit 7 is supplied through a square wave circuit 22 to a +180° crossover detection circuit 23 and to a −180° crossover detection circuit 24, the square wave circuit 22 shaping the waveform of the signals inputted thereto into square waves. The +180° crossover detection circuit 23 detects the positive to negative change of the polarity of the sinusoidal signal sin($\theta_1-\theta_2$) when the difference of angle ($\theta_1-\theta_2$) becomes 180° while the −180° crossover detection circuit 24 detects the negative to positive change of the polarity of the sinusoidal signal sin($\theta_1-\theta_2$) when the difference of angle ($\theta_1-\theta_2$) becomes −180°. The sinusoidal signal sin($\theta_1-\theta_2$) is also supplied through contacts 25a of a signal switching circuit 25 to the limiter 8 which limits the amplitude of the inputted signal to a predetermined range. An output terminal of the +180° crossover detection circuit 23 is connected to one input terminal of an AND circuit 26, while an output terminal of the −180° crossover detection circuit 24 is connected to one input terminal of another AND circuit 27. And the cosine signal cos($\theta_1-\theta_2$) inputted to the signal processing circuit 7 is supplied through a square wave circuit 28 to a polarity decision circuit 29 which outputs a H level signal when the cosine signal cos($\theta_1-\theta_2$) is negative. An output terminal of the polarity decision circuit 29 is connected to the other input terminal of the AND circuit 26 and to the other input terminal of the AND circuit 27. An output terminal of the AND circuit 26 is connected to a SET terminal of a flip-flop 30, while an output terminal of the AND circuit 27 is connected to a SET terminal of another flip-flop 31. The sinusoidal signal sin($\theta_1-\theta_2+45°$) inputted to the signal processing circuit 7 is supplied through a square wave circuit 32 to a flip-flop reset circuit 33. This flip-flop reset circuit 33 is connected to a RESET terminal of the flip-flop 30 and to a RESET terminal of the flip-flop 31. And an output terminal of the flip-flop 30 is connected to a + input terminal of an operational amplifier 34 and to one input terminal of an OR circuit 35. An output terminal of the flip-flop 31 is connected to a − input terminal of the operational amplifier 34 and to the other input terminal of the OR circuit 35. An output terminal of the operational amplifier 34 is connected through contacts 25b of the signal switching circuit 25 to the input terminal of the limiter 8, and an output terminal of the OR circuit 35 is connected to the ±180° crossover switching circuit 36. This ±180° crossover switching circuit 36 closes the contacts 25b of the signal switching circuit 25 when a H level signal is inputted thereto, and closes the contacts 25a when a L level signal is inputted thereto.

The operation of this system will now be described with reference to FIG. 6.

It is assumed that the steering handle 1 begins to be pivotally moved when the steering angle $\theta_1$ of the steering handle 1 and the follow-up angle $\theta_2$ of the rotary housing 2 are equal to each other. In this case, a difference of angle appears between the steering angle $\theta_1$ and the follow-up angle $\theta_2$. It is also assumed that the difference of angle ($\theta_1-\theta_2$) becomes positive when the steering handle 1 is pivoted clockwise and that the difference of angle ($\theta_1-\theta_2$) becomes negative when the steering handle 1 is pivoted counterclockwise. The output signals sin $\theta_1$ and cos $\theta_1$ of the angular position detector 3 and the output signals sin $\theta_2$ and cos $\theta_2$ of the angular position detector 4 are inputted to the calculation circuit 6 which in turn executes a calculation using these signals to form three kinds of signals, i.e., the sinusoidal signals sin($\theta_1-\theta_2$) and sin($\theta_1-\theta_2+45°$) and the cosine signal cos($\theta_1-\theta_2$) (see FIG. 6). The waveforms of the signals sin($\theta_1-\theta_2$), sin($\theta_1-\theta_2+45°$) and cos($\theta_1-\theta_2$) outputted from the calculation circuit 6 are shaped into square waves by the square wave circuits 22, 23 and 28, respectively. And in the case where the difference of angle ($\theta_1-\theta_2$) is within the range of between −180° and +180°, i.e., −180°≦($\theta_1-\theta_2$)≦+180°, both of the +180° crossover detection circuit 23 and −180° crossover detection circuit 24 do not operate, so that the ±180° crossover switching circuit 36 opens the contacts 25b of the signal switching circuit 36 and closes the contacts 25a of the same. As a result, the sinusoidal signal sin($\theta_1-\theta_2$) is inputted to the limiter 8 intactly. The output signal Sl of the limiter 8 is therefore a signal derived from the sinusoidal signal sin($\theta_1-\theta_2$) with its amplitude limited to the values determined by the limiter 8.

Next, when the difference of angle ($\theta_1-\theta_2$) exceeds 180°, the both output signals of the +180° crossover detection circuit 23 and the polarity decision circuit 29 go to H level, so that the flip-flop 30 is brought into a set state. As a result, ±180° crossover switching circuit 36 opens the contacts 25a of the signal switching circuit 25 and closes the contacts 25b of the same, so that a positive voltage obtained by amplifying the output of the flip-flop 30 in a non-inverting fashion by the operational amplifier 34 is fed to the input terminal of the limiter 8. And during this operation, the signal Sl is kept to a constant voltage level. Thus, the rotary housing 2 is rotated in accordance with the output signal Sl of the limiter 8. And when the difference of angle ($\theta_1-\theta_2$) is decreased to an extent that the polarity of the sinusoidal signal sin($\theta_1-\theta_2+45°$) is changed, that is to say, the difference of angle ($\theta_1-\theta_2$) becomes less than +135°, the flip-flop 30 is brought into a reset state (see the waveform indicated by a dot and dash line in FIG. 6). Consequently, ±180° crossover switching circuit 36 opens the contacts 25b of the signal switching circuit 25 and closes the contacts 25a of the same, so that the sinusoidal signal sin($\theta_1-\theta_2$) is intactly supplied to the input terminal of the limiter 8.

When the difference of angle ($\theta_1-\theta_2$) becomes less than −180°, the both outputs of the −180° crossover detection circuit 24 and the polarity decision circuit 29 go to H level, so that the flip-flop 31 is brought into a set state. As a result, ±180° crossover switching circuit 36 opens the contacts 25a of the signal switching circuit 25 and closes the contacts 25b of the same, so that a negative voltage obtained by inversely amplifying the output of the flip-flop 31 by the operational amplifier 34 is applied to the input terminal of the limiter 8. Thus the rotary housing 2 is rotated in accordance with the signal Sl outputted from the limiter 8, the signal Sl being at a negative constant voltage. And when the difference of angle ($\theta_1-\theta_2$) is increased to an extent that the polarity of the sinusoidal signal sin($\theta_1-\theta_2+45°$) is changed, that is to say, the difference of angle ($\theta_1-\theta_2$) becomes greater than −45°, the flip-flop reset circuit 33 resets the flip-flop 31 (see the waveform indicated by the dot and dash line in FIG. 6), so that the ±180° crossover switching circuit 36 opens the contacts 25b of the signal switching circuit 25 and closes contacts 25a of the same. As a result, the sinusoidal signal sin($\theta_1-\theta_2$) is intactly supplied to the input terminal of the limiter 8.

Figure 6:
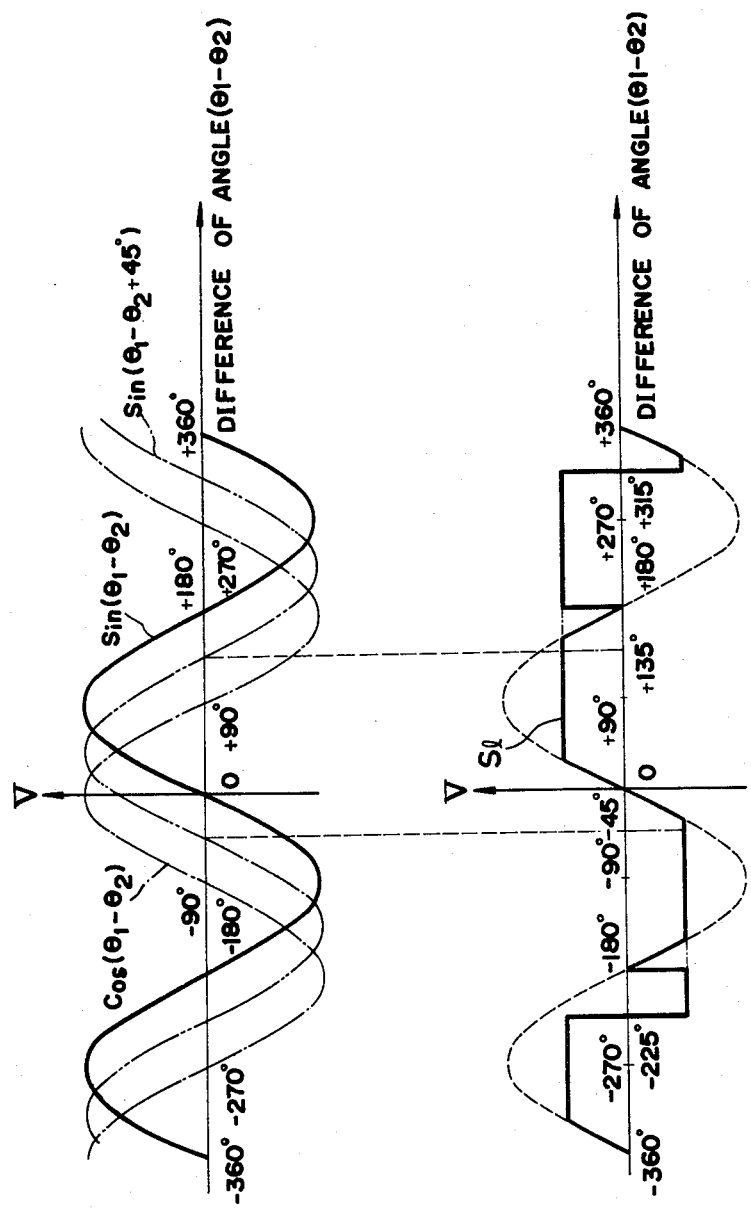
FIG. 6 is an illustration showing the waveforms for explaining the operation of the embodiment shown in FIG. 1.

The signal thus inputted to the limiter 8 is outputted to the servo control circuit 9 as the signal Sl whose amplitude has been limited to predetermined levels by the limiter 8, as shown in FIG. 6.

The servo control circuit 9 controls the servomotor 9 in accordance with the signal Sl, and the servomotor 9 controls the hydraulic motor 19 through the hydraulic pump 11, the hydraulic cylinder 14 and the hydraulic pump 15 to rotate the worm 20 of the shaft 5 in accordance with its rotational movement. As a result, the worm wheel 21 rotates so that the rotary housing 2 of the Z-type propulsion apparatus begins to rotate in unison with the steering handle 1 in the direction of rotation thereof. And when the difference of angle ($\theta1-\theta2$) reaches 0 the rotary housing 2 stops. Thus, with the construction of this system, the signal processing circuit 7 can control the rotary housing 2 so as to rotate in unison with the steering handle 1 in the direction of rotation thereof on condition that the difference of angle ($\theta1-\theta2$) is within the range of between $-225°$ and $+315°$, i.e., $-225°<(\theta1-\theta2)<+315°$.

With the construction of this system, if the steering handle is operated to command such a rapid rotation of the rotary housing 2, which is beyond the response characteristic of the mechanical system, that the difference of angle ($\theta1-\theta2$) becomes less than $-225°$ ($-360°\leq(\theta1-\theta2)\leq-225°$) or more than $+315°$ ($+315°\leq(\theta1-\theta2)\leq+360°$), the rotary housing rotates in the direction opposite to that of rotation of the steering handle 2. However, when it is desired to rotate the rotary housing by more than 225°, the steering handle is usually operated so that it rotates not in the forward direction beyond 180° but in the reverse direction. Actually, it is rare to command the rotary housing to rotate by more than 225°, so that any significant problem will not be encountered.

The sinusoidal signals $\sin(\theta1-\theta2)$ and $\sin(\theta1-\theta2+45°)$ and the cosine signal $\cos(\theta1-\theta2)$ may alternatively be obtained by employing synchros and Scott transformers and removing the ac components from its output signals. These sinusoidal and cosine signals may also be obtained by employing resolvers and differential transformers or by employing rotary encoders or the like.

Figure 7:
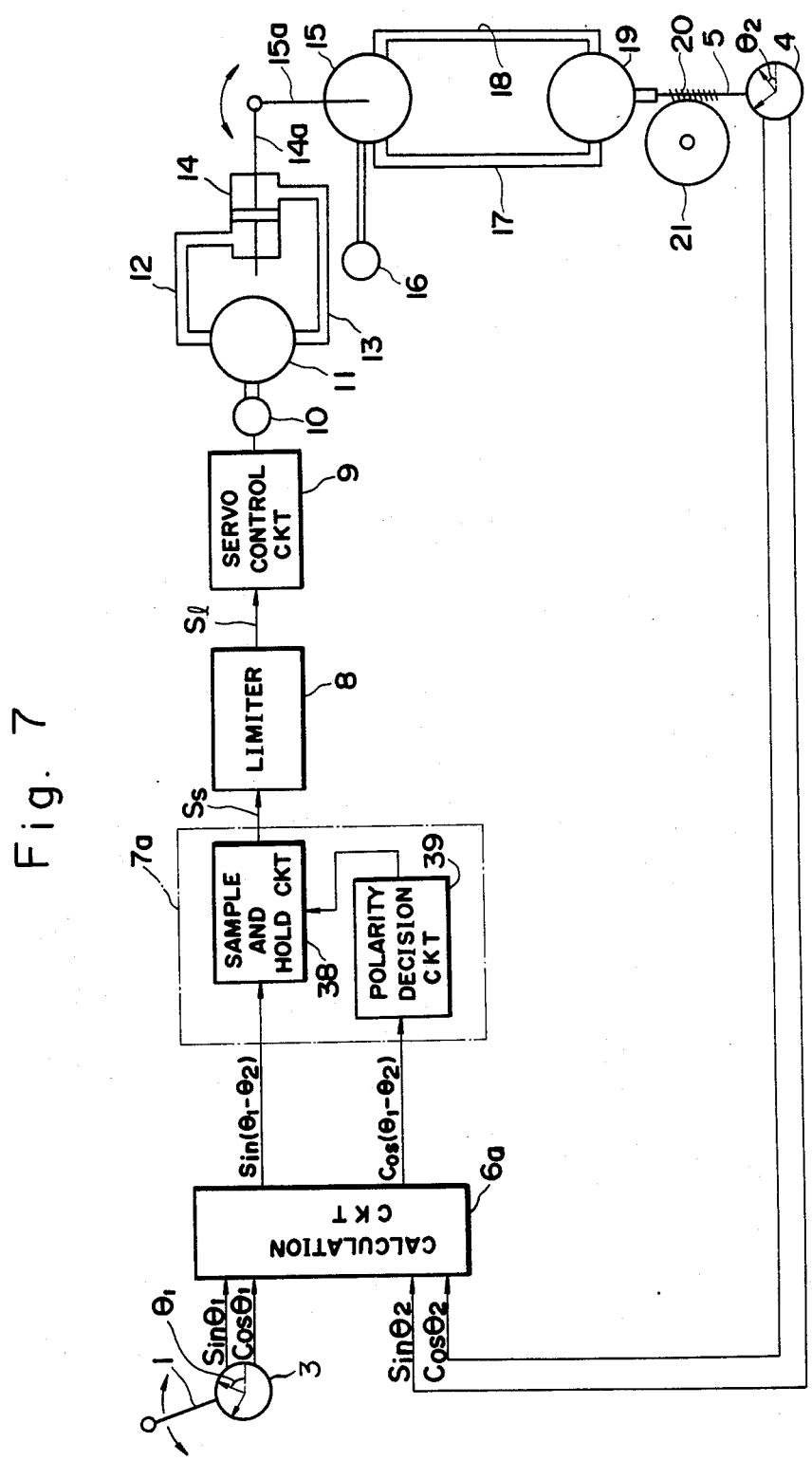
FIG. 7 is a block diagram showing the construction of the second embodiment of the invention.

FIG. 7 shows a second embodiment of the present invention in which like references denote same parts of the first embodiment of the invention. A calculation circuit 6a of this system is so constructed as to supply the sinusoidal signal $\sin(\theta1-\theta2)$ representing a sine of the difference of angle ($\theta1-\theta2$) between the angular position $\theta1$ of the steering handle 1 and the angular position $\theta2$ of the rotary housing 2 to a sample and hold circuit 38 of a signal processing circuit 7a and to supply the cosine signal $\cos(\theta1-\theta2)$ representing a cosine of the difference of angle ($\theta1-\theta2$) to a polarity decision circuit (comparator) 39 of the signal processing circuit 7a. The polarity decision circuit 39 detects the polarity of the cosine signal $\cos(\theta1-\theta2)$ and feeds the detection result to the sample and hold circuit 38. The sample and hold circuit 38 is so constructed as to hold the inputted signal when the polarity decision circuit 39 detects a negative signal, and an output terminal of this sample and hold circuit 38 is connected to the limiter 8. The limiter 8 is connected to the servo control circuit 9 for controlling the servomotor 10.

The operation of this system will now be described with reference to FIG. 8.

Figure 8:
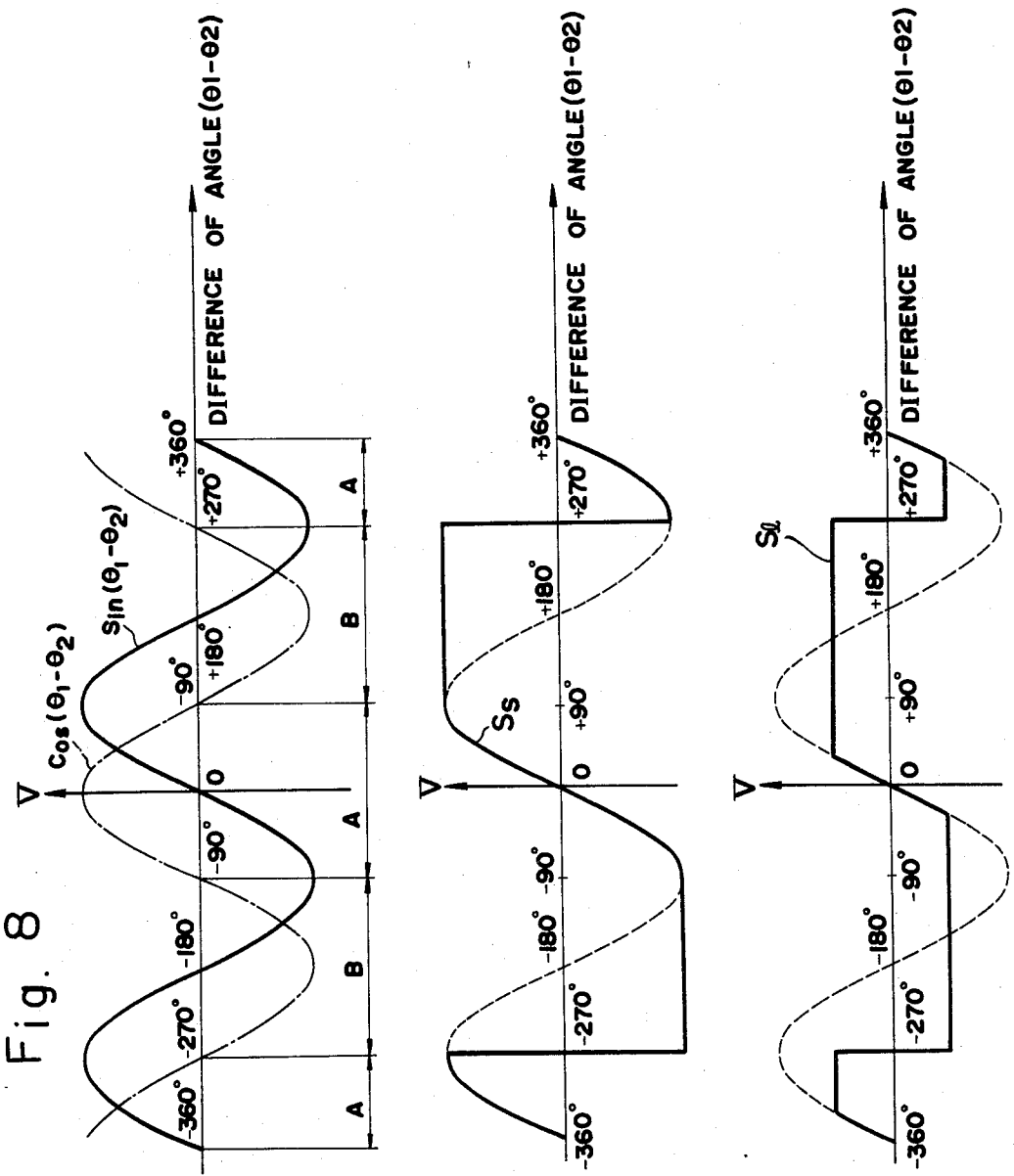
FIG. 8 is an illustration showing the waveforms for explaining the operation of the embodiment shown in FIG. 7.

When the steering handle 1 is pivotally moved, the calculation circuit 6a executes a calculation using the output signals sin $\theta1$ and cos $\theta1$ of the angular position detector 3 and the output signals sin $\theta2$ and cos $\theta2$ of the angular position detector 4 to form two kinds of signals, i.e., the sinusoidal signal $\sin(\theta1-\theta2)$ and the cosine signal $\cos(\theta1-\theta2)$, (see FIG. 8). The polarity decision circuit 39 detects the polarity of the cosine signal $\cos(\theta1-\theta2)$ outputted from the calculation circuit 6a and brings the sample and hold circuit 38 into a sample mode A when the cosine signal $\cos(\theta1-\theta2)$ is equal to or more than a predetermined value 0 ($\cos(\theta1-\theta2)\geq0$). As a result, the sinusoidal signal $\sin(\theta1-\theta2)$ outputted from the calculation circuit 6a to the sample and hold circuit 38 is intactly supplied to the limiter 8. The polarity decision circuit 39 brings the sample and hold circuit 38 into a hold mode B when the cosine signal $\cos(\theta1-\theta2)$ is less than 0 ($\cos(\theta1-\theta2)<0$). As a result, a signal representative of the value $\sin(+90°)$ is inputted to the limiter 8 when the difference of angle ($\theta1-\theta2$) is greater than 90° (($\theta1-\theta2)>90°$), while a signal representative of the value $\sin(-90°)$ is inputted to the limiter 8 when the difference of angle ($\theta1-\theta2$) is less than 90° (($\theta1-\theta2)<90°$). An output signal Ss of the sample and hold circuit 38 is the sinusoidal signal $\sin(\theta1-\theta2)$ itself outputted from the calculation circuit 6a when the difference of angle ($\theta1-\theta2$) is between $-90°$ and $+90°$ ($-90°\leq(\theta1-\theta2)\leq+90°$). The signal Ss is a signal representative of the value $\sin(-90°)$ when the difference of angle ($\theta1-\theta2$) is between $-270°$ and $-90°$ ($-270°<(\theta1-\theta2)<-90°$) and is a signal representative of the value $\sin(+90°)$ when the difference of angle ($\theta1-\theta2$) is between $+90°$ and $+270°$ ($+90°<(\theta1-\theta2)<+270°$). The limiter 8 limits the amplitude of the output signal of the sample and hold circuit 38 to form a signal Sl shown in FIG. 8 and feeds it to the servo control circuit 9. The servo control circuit 9 controls the servomotor 10 in accordance with the signal Sl, and the servomotor 10 controls the hydraulic motor 19 through the hydraulic pump 11, the hydraulic cylinder 14 and the hydraulic pump 15 to rotate the worm 20 of the shaft 5. As a result, the worm wheel 21 rotates so that the rotary housing 2 of the Z-type propulsion apparatus begins to rotate in unison with the steering handle 1 in the direction of the rotation thereof. And when the difference of angle ($\theta1-\theta2$) reaches 0 the rotary housing 2 stops. Thus, the signal processing circuit 7a can control the rotary housing 2 to rotate in unison with the steering handle 1 in the direction of rotation thereof on condition that the difference of angle ($\theta1-\theta2$) is within the range of between $-270°$ and $+270°$, i.e., $-270°<(\theta1-\theta2)<+270°$.

In the above-described system, the polarity decision circuit 39 is so constructed as to hold and output the sinusoidal signal $\sin(\theta1-\theta2)$ when the cosine signal $\cos(\theta1-\theta2)$ is negative, however the circuit 39 may be modified so as to hold the sinusoidal signal $\sin(\theta1-\theta2)$ when the cosine signal $\cos(\theta1-\theta2)$ is less than a predetermined value other than 0. With the construction of this system, the sample and hold circuit 38 does not hold the sinusoidal signal $\sin(\theta1-\theta2)$ when the difference of angle ($\theta1-\theta2$) is between $-360°$ and $-270°$ ($-360°\leq(\theta1-\theta2)\leq-270°$) or when the difference of angle ($\theta1-\theta2$) is between $+270°$ and $+360°$ ($+270°\leq(\theta1-\theta2)\leq+360°$). Therefore, if the steering handle is operated to command such a rapid rotation of the rotary housing 2, which is beyond the response characteristic of the mechanical system, that the absolute value of the difference of angle ($\theta1-\theta2$) becomes greater than ±270°, the rotary housing 2 rotates in the direction opposite to that of rotation of the steering handle 1. However, when it is desired to rotate the rotary housing by more than ±270°, the steering handle is usually operated in such a manner that the rotary housing rotates not in the forward direction beyond 180° but in the reverse direction. Actually, it is rare to command the rotary housing to rotate by more than ±270°, so that any significant problem will not be encountered.

Figure 9:
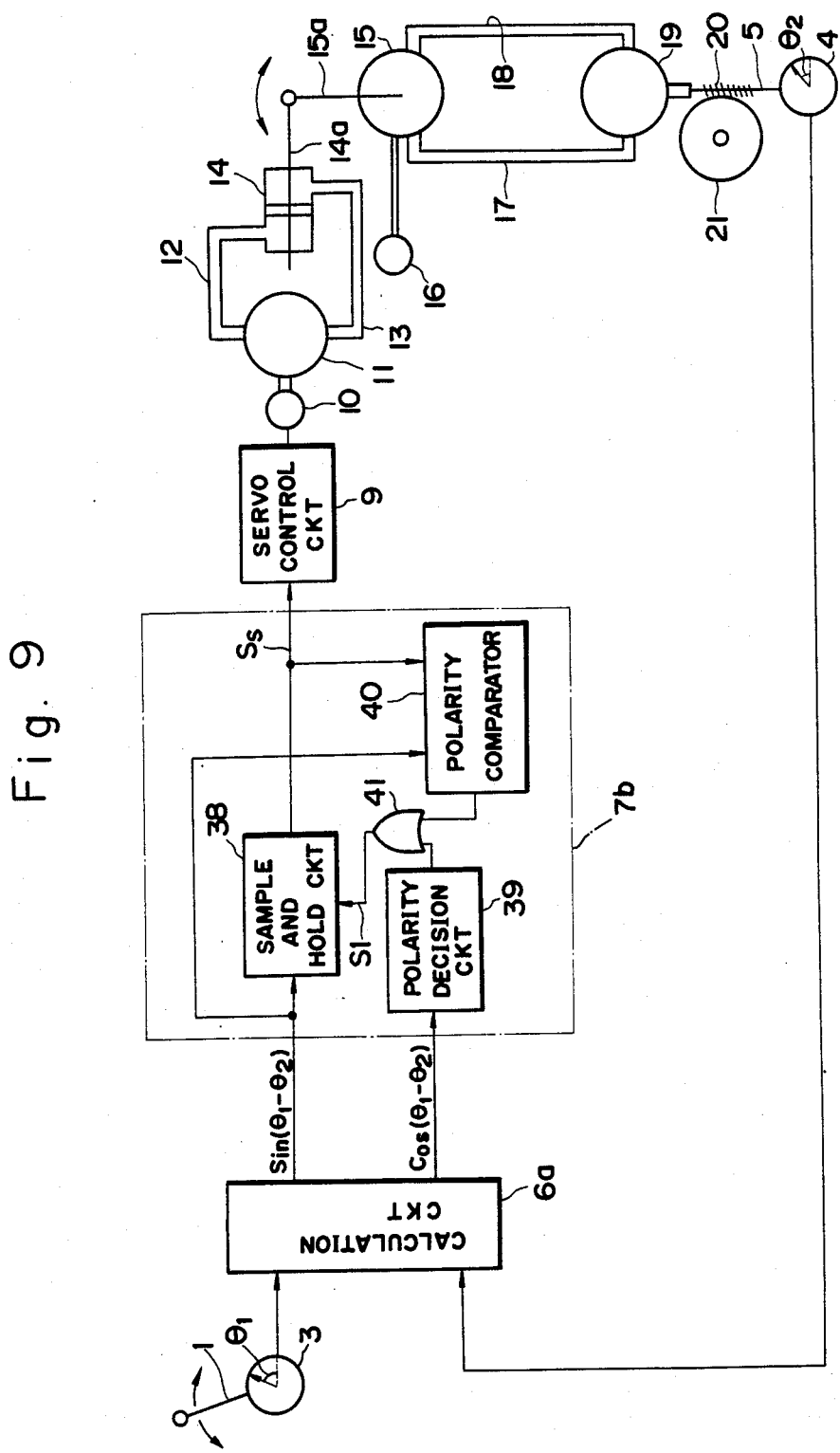
FIG. 9 is a block diagram showing the construction of the third embodiment of the invention.

FIG. 9 shows a third embodiment of the invention in which like references denote same parts of the second invention.

In the figure, the sinusoidal signal sin($\theta1-\theta2$) outputted from the calculation circuit 6a is supplied to the sample and hold circuit 38 of a signal processing circuit 7b and to one input terminal of a polarity comparator 40. The cosine signal cos($\theta1-\theta2$) outputted from the circuit 6a is fed to the polarity decision circuit 39 of the signal processing circuit 7b. An output signal of the sample and hold circuit 38 is supplied to the input terminal of the servo control circuit 9 and to the other input terminal of the polarity comparator 40. The polarity decision circuit 39 outputs a true signal when the cosine signal cos($\theta1-\theta2$) is negative, and the polarity comparator 40 outputs a true signal when the two input signals are different in polarity to each other. And the output signals of the polarity decision circuit 39 and the polarity comparator 40 are logically added by an OR circuit 41, and the resultant signal is fed to the sample and hold circuit 38.

When the output signal S1 of the OR circuit 41 is true, the sample and hold circuit 38 holds its input signal. And when the signal S1 is false, the circuit 38 samples its input and outputs it.

The operation of this system will now be described with reference to FIG. 12. When the difference of angle ($\theta1-\theta2$) is between $-90°$ and $+90°$ ($-90° \leq (\theta1-\theta2) \leq +90°$), the output of the polarity decision circuit 39 is not true. And in this case, the output of the polarity comparator 40 is also not true, so that the sample and hold circuit 38 is brought into the sample mode A to output the sinusoidal signal sin($\theta1-\theta2$) intactly.

When the difference of angle ($\theta1-\theta2$) exceeds $+90°$, the cosine signal cos($\theta1-\theta2$) becomes less than 0, so that a true signal is outputted from the polarity decision circuit 39. As a result, the OR circuit 41 outputs the signal S1 (hold signal) to bring the sample and hold circuit 38 into the hold mode B, so that the circuit 38 outputs a signal representative of the value sin($+90°$), i.e., the sinusoidal signal sin($\theta1-\theta2$) at the moment when the difference of angle ($\theta1-\theta2$) is equal to $+90°$. The hold mode B is maintained so long as the difference of angle ($\theta1-\theta2$) is between $+90°$ and $+270°$ ($+90° < (\theta1-\theta2) < +270°$). If the difference of angle exceeds $+270°$, the cosine signal cos($\theta1-\theta2$) becomes positive. In this case however, the polarities of the input and output signals of the sample and hold circuit 38 differs from each other, so that the polarity comparator 40 outputs a true signal, thereby the hold signal S1 being outputted from the OR circuit 41. As a result, the sample and hold circuit 38 is brought into the hold mode C to output the positive value sin($+90°$). The hold mode C is maintained so long as the difference of angle ($\theta1-\theta2$) is between $+270°$ and $+360°$ ($+270° \leq (\theta1-\theta2) < +360°$), since the polarity of the output of the sample and hold circuit 38 differs from that of the sinusoidal signal sin($\theta1-\theta2$).

If the difference of angle becomes less than $-90°$, the cosine signal cos($\theta1-\theta2$) becomes less than 0 so that the polarity decision circuit 39 outputs a true signal. As a result, the OR circuit 41 outputs the hold signal S1, so that the sample and hold circuit 38 is brought into the hold mode B to output sin($-90°$), i.e., the value of the sinusoidal signal sin($\theta1-\theta2$) at the moment when the difference of angle ($\theta1-\theta2$) is equal to $-90°$. The hold mode B is maintained so long as the difference of angle ($\theta1-\theta2$) is between $-270°$ and $-90°$ ($-270° < (\theta1-\theta-2) < -90°$). If the difference of angle ($\theta1-\theta2$) becomes less than $-270°$, the cosine signal cos($\theta1-\theta2$) becomes positive. In this case however, the polarity comparator 40 outputs a true signal, since the polarities of the input and output of the sample and hold circuit 38 are different from each other. As a result, the OR circuit 41 outputs the signal S1, so that the sample and hold circuit 38 is brought into the hold mode C to output the negative value sin($-90°$). The hold mode is maintained so long as the difference of angle ($\theta1-\theta2$) is between $-360°$ and $-270°$ ($-360° < (\theta1-\theta2) \leq -270°$), since the polarities of the input and output of the sample and hold circuit 38 differ from each other.

Thus, with the construction of this system, the rotary housing 2 is controlled to rotate in unison with the steering handle 1 in the direction of rotation thereof on condition that the difference of angle ($\theta1-\theta2$) is within the range of ±360°. In this system, the polarity decision circuit 39 may be modified so as to output a true signal when the cosine signal cos($\theta1-\theta2$) is less than a predetermined value other than 0.

Figure 10:
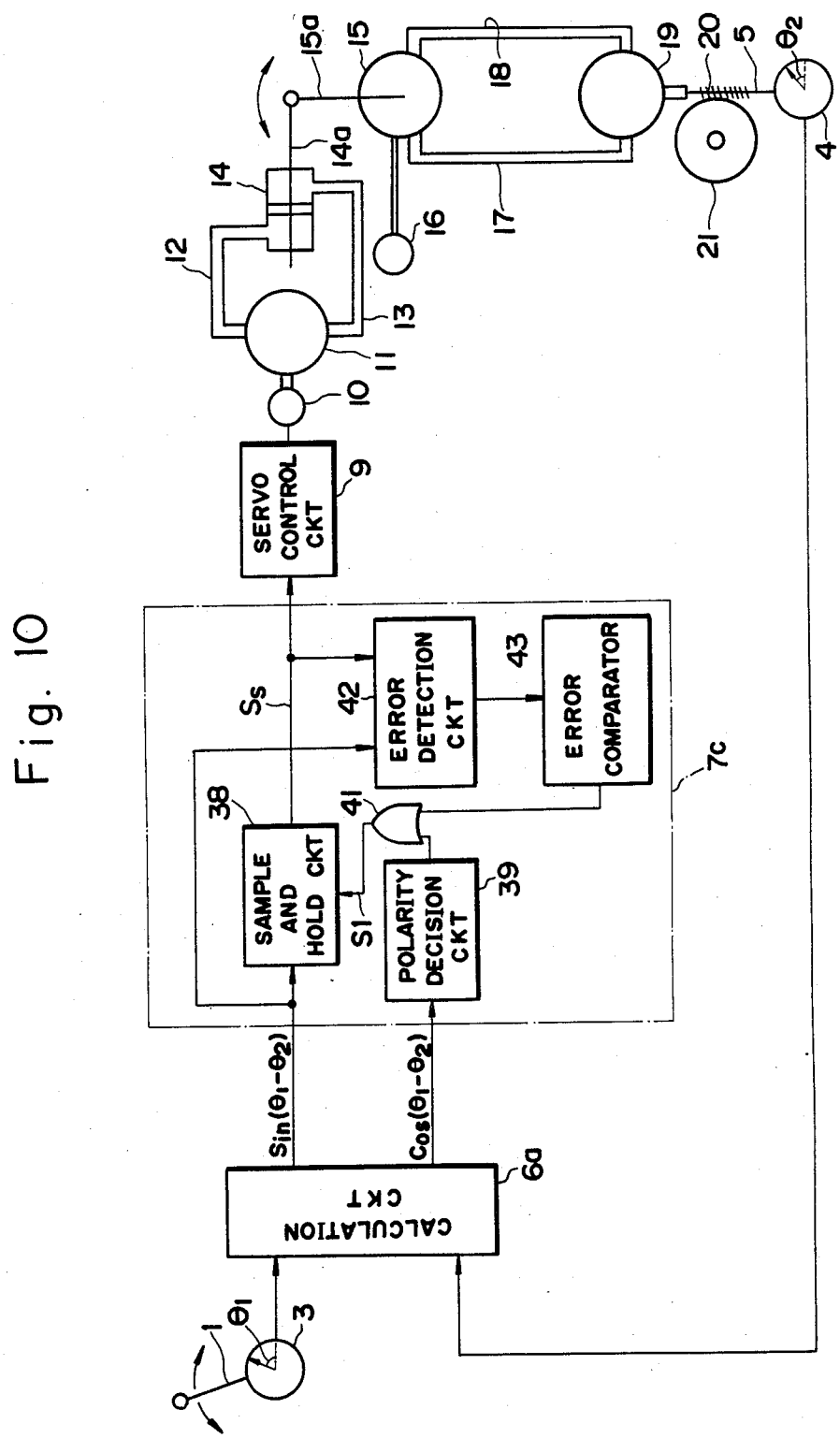
FIG. 10 is a block diagram showing the construction of the fourth embodiment of the invention.

FIG. 10 shows a fourth embodiment of the present invention.

This system differs from the system shown in FIG. 9 in the following respects. In a signal processing circuit 7c of this system, the both signals at the input and output terminals of the sample and hold circuit 38 are inputted to both input terminals of an error detection circuit 42. The error detection circuit 42 detects the difference (error) between the two signals inputted thereto and outputs the error to an error comparator 43. The error comparator 43 is constructed in such a manner that it outputs a true signal when the output of the error detection circuit 42 is greater than a predetermined value (for example, 1 corresponding to the value sin 90°). The output of the error comparator 43 is supplied to the other input terminal of the OR circuit 41.

The operation of this system will now be described with reference to FIG. 12.

When the difference of angle ($\theta1-\theta2$) is within ±90°, the output of the polarity decision circuit 39 is not true. And in this case, the output of the error comparator 43 is also not true since the output of the error detector 42 is 0, so that the sample and hold circuit 38 is brought into the sample mode A to output the sinusoidal signal sin($\theta1-\theta2$) intactly.

When the difference of angle ($\theta1-\theta2$) exceeds $+90°$, the cosine signal cos($\theta1-\theta2$) becomes less than 0, so that a true signal is outputted from the polarity decision circuit 39. As a result, the OR circuit 41 outputs the signal S1 to bring the sample and hold circuit 38 into the hold mode B, so that the circuit 38 outputs a signal representing the value sin($+90°$), i.e., the sinusoidal signal sin($\theta1-\theta2$) at the moment when the difference of angle ($\theta1-\theta2$) is equal to $+90°$. The hold mode B is maintained so long as the difference of angle ($\theta1-\theta2$) is between $+90°$ and $+270°$ ($+90° < (\theta1-\theta2) < +270°$). If the difference of angle ($\theta1-\theta2$) exceeds $+270°$, the cosine signal cos($\theta1-\theta2$) becomes positive. In this case however, the output (error) of the error detection circuit 42 is greater than the value predetermined at the error comparator 43 (it is assumed herein that the predetermined value is 1), so that the error comparator 43 outputs a true signal, thereby the hold signal S1 being outputted from the OR circuit 41. As a result, the sample and hold circuit 38 is brought into the hold mode C to output the positive value sin(+90°). The hold mode C is maintained so long as the difference of angle ($\theta 1 - \theta 2$) is between +270° and +360° (+270°≦($\theta 1-\theta 2$)<+360°), since the difference between the output and input of the sample and hold circuit 38 is greater than the predetermined value (=1).

If the difference of angle ($\theta 1-\theta 2$) becomes less than $-90°$, the cosine signal cos($\theta 1-\theta 2$) becomes less than 0 so that the polarity decision circuit 39 outputs a true signal. As a result, the OR circuit 41 outputs the hold signal S1, so that the sample and hold circuit 38 is brought into the hold mode B to output sin($-90°$), i.e., the value of the sinusoidal signal sin($\theta 1-\theta 2$) at the moment when the difference of angle ($\theta 1-\theta 2$) is equal to $-90°$. The hold mode B is maintained so long as the difference of angle ($\theta 1-\theta 2$) is between $-270°$ and $-90°$ ($-270°<(\theta 1-\theta 2)<-90°$). If the difference of angle ($\theta 1-\theta 2$) becomes less than $-270°$, the cosine signal cos($\theta 1-\theta 2$) becomes positive. In this case however, the error comparator 43 outputs a true signal, since the output (error) of the error detection circuit 42 is greater than the value (=1) predetermined at the error comparator 43. As a result, the OR circuit 41 outputs the signal S1, so that the sample and hold circuit 38 is brought into the hold mode C to output the negative value sin($-90°$). The hold mode C is maintained so long as the difference of angle ($\theta 1-\theta 2$) is between $-360°$ and $-270°$ ($-360°<(\theta 1-\theta 2)\leq-270°$), since the difference between the output and input of the sample and hold circuit 38 is greater than the predetermined value.

Thus, with the construction of this system, the rotary housing 2 is controlled to rotate in unison with the steering handle 1 in the direction of rotation thereof on condition that the difference of angle ($\theta 1-\theta 2$) is within the range of ±360°.

Incidentally, a limiter circuit may be provided at the input terminal of the servo control circuit 9 to limit the amplitude of the output signal of the sample and hold circuit 38 to appropriate values. In the system described above, it is assumed that the value predetermined at the error comparator 43 is 1, however, the value may be increased or decreased from 1 to expand or reduce the hold mode range. Further, the polarity decision circuit 39 may be modified so as to output a true signal when its input becomes less than a predetermined value other than 0.

Figure 11:
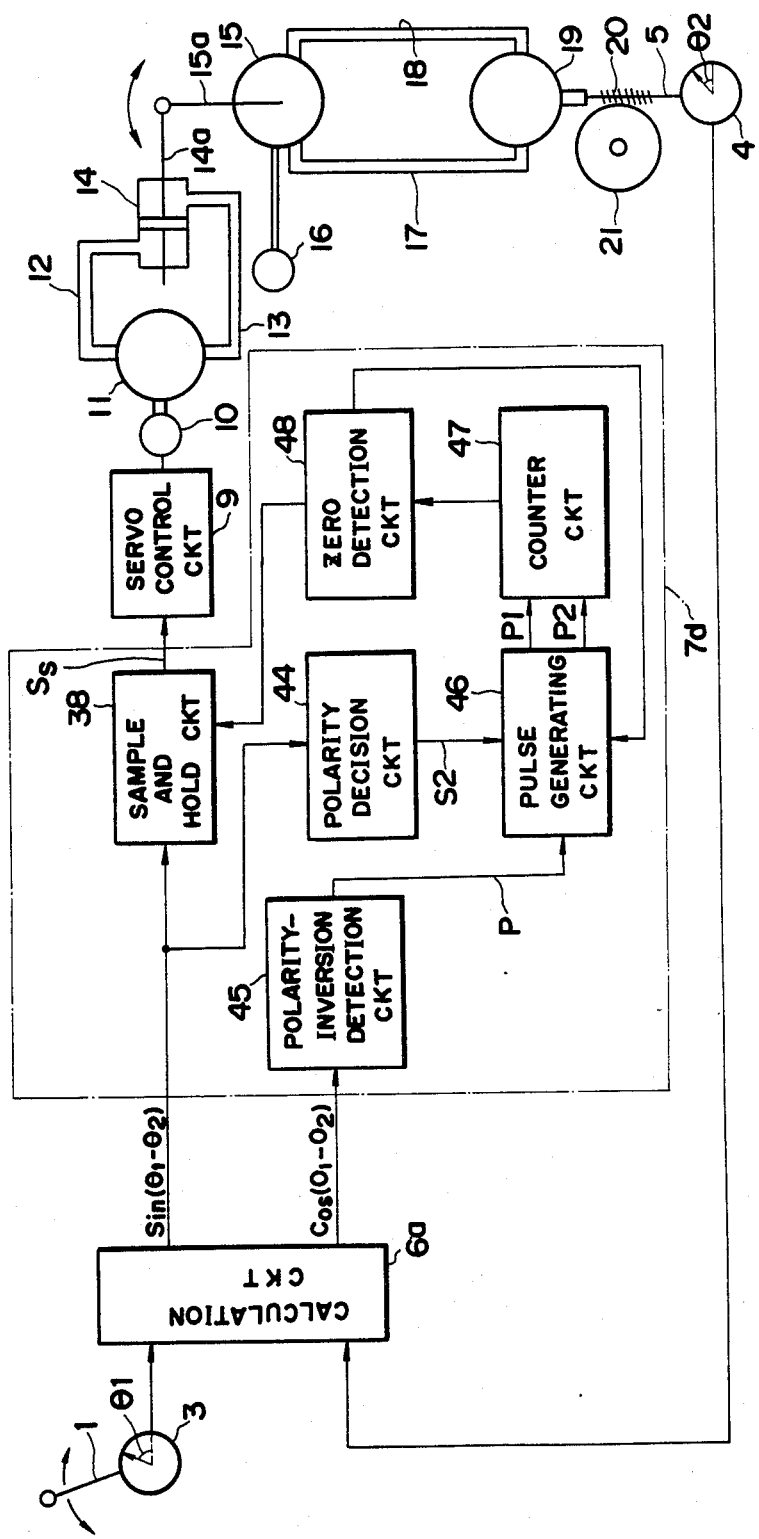
FIG. 11 is a block diagram showing the construction of the fifth embodiment of the invention.

FIG. 11 shows a fifth embodiment of the present invention.

A signal processing circuit 7d of this system shown in this figure differs from those of the second to fourth embodiments in the following respects.

The sinusoidal signal sin($\theta 1-\theta 2$) outputted from the calculation circuit 6a is supplied to the input terminal of the sample and hold circuit 38 and to an input terminal of a polarity decision circuit 44. The polarity decision circuit 44 outputs a signal S2 indicating whether the sinusoidal signal sin($\theta 1-\theta 2$) is positive or negative. The cosine signal cos($\theta 1-\theta 2$) outputted from the calculation circuit 6a is supplied to a polarity-inversion detection circuit 45. The polarity-inversion detection circuit 45 outputs a pulse signal P when a positive to negative or a negative to positive change of the polarity of the cosine signal cos($\theta 1-\theta 2$) is detected. The pulse signal P is fed to a pulse generating circuit 46. When the pulse signal P is inputted to the the pulse generating circuit 46 with a signal S2 representing a polarity of the sinusoidal signal sin($\theta 1-\theta 2$) different from that represented by it when the preceding pulse signal P is generated, the circuit 46 outputs one of an increment pulse P1 and a decrement pulse P2 which is the same as the pulse precedingly outputted therefrom. The pulse generating circuit 46 outputs one of the increment and decrement pulses which is of the type different from that of the pulse precedingly outputted therefrom, when the pulse signal P is inputted thereto with the signal S2 representing the same polarity of the signal sin($\theta 1-\theta 2$) as that represented by it when the preceding pulse signal P is generated. The increment and decrement pulses are fed to a counter circuit 47. The count value outputted from the counter circuit 47 is supplied to a zero detection circuit 48 to decide whether the value is zero or not. This zero detection circuit 48 brings the sample and hold circuit 38 into a sample mode when the count value of the counter circuit 47 is zero, while it brings the sample and hold circuit into a hold mode when the count value is other than 0.

The operation of the above system will now be described with reference to FIG. 12.

When the difference of angle ($\theta 1-\theta 2$) is within ±90° the polarity of the cosine signal cos($\theta 1-\theta 2$) does not change, so that the pulse signal P is not outputted. In this case, the count value of the counter circuit 47 is 0. And therefore, the sample and hold circuit 38 is kept in the sample mode by the output of the zero detection circuit 48 and outputs the sinusoidal signal intactly.

Next, when the difference of angle ($\theta 1-\theta 2$) exceeds +90°, the cosine signal ($\theta 1-\theta 2$) changes its polarity from a positive to a negative state, as indicated by an arrow a in FIG. 12, so that pulse signal P is outputted from the polarity-inversion detection circuit 45. At this moment, the polarity decision circuit 44 outputs to the pulse generating circuit 46 signal S2 indicating that the sinusoidal signal sin($\theta 1-\theta 2$) is positive. The pulse generating circuit 46 stores the state indicating that the sinusoidal signal sin($\theta 1-\theta 2$) is positive and at the same time outputs increment pulse P1 to the counter circuit 47 since the contents of the counter circuit 47 is 0. As a result, the count value of the counter circuit 47 is incremented from 0 to +1, which causes the zero detection circuit 48 to output the hold signal to the sample and hold circuit 38. The sample and hold circuit 38 therefore holds and outputs (hold mode) sin($-90°$), i.e., the value of the sinusoidal signal sin($\theta 1-\theta 2$) at the moment when the difference of angle ($\theta 1-\theta 2$) is equal to $-90°$. Each time when the polarity of the cosine signal cos($\theta 1-\theta 2$) changes, the pulse generating circuit 46 compares the polarity of the sinusoidal signal sin($\theta 1-\theta 2$) at that moment with the polarity of the sinusoidal signal sin($\theta 1-\theta 2$) stored by itself at the moment of the preceding change of the polarity of the cosine signal cos($\theta 1-\theta 2$). And if the both polarities differ from each other, the pulse generating circuit 46 outputs to the counter circuit 47 the same kind of pulse signal (pulse signal in the same count direction) as that precedingly outputted therefrom, the pulse signal being an incremental pulse signal or a decremental pulse signal. On the other hand, if the both polarities coincide with each other, the pulse generating circuit 46 outputs a pulse signal in the different count direction to the counter circuit 47. As a result, the contents of the counter circuit 47 is incremented or decremented by the pulse signal.

When the difference of angle ($\theta_1-\theta_2$) becomes less than $-90°$, the polarity of the cosine signal $\cos(\theta_1-\theta_2)$ changes from positive to negative as indicated by an arrow c in FIG. 12, so that the polarity-inversion circuit 45 outputs the pulse signal P. At this time, the polarity decision circuit 44 outputs a signal indicating that the sinusoidal signal $\sin(\theta_1-\theta_2)$ is negative. The pulse generating circuit 46 stores the negative polarity of the sinusoidal signal $\sin(\theta_1-\theta_2)$, and outputs the increment pulse P1 to the counter circuit 47 since the contents of the counter circuit 47 is zero. Consequently, the contents of the counter circuit 47 is incremented from 0 to $+1$, so that the zero detection circuit 48 outputs the holding signal to the sample and hold circuit 38. As a result, the sample and hold circuit 38 holds and outputs (hold mode) $\sin(-90°)$, i.e., the value of the sinusoidal signal $\sin(\theta_1-\theta_2)$ at the moment when the difference of angle ($\theta_1-\theta_2$) is equal to $-90°$. In this embodiment, although the counter circuit 47 is supplied with an increment pulse to increment the contents thereof from 0 to 1 when the difference of angle ($\theta_1-\theta_2$) becomes less than $-90°$, this system may be modified so that when the difference of angle ($\theta_1-\theta_2$) becomes less than $-90°$ decrement pulse P2 is supplied to the counter circuit 47 to decrement its contents from 0 to $-1$.

Next, the case where the steering handle is abruptly rotated clockwise by $+300°$ will be described in detail.

In the beginning of a clockwise rotation of the steering handle 1, the follow-up angle $\theta_2$ remains 0 since the follow-up operation has not yet been commenced, so that only the steering angle $\theta_1$ begins to increase. And when the steering angle $\theta_1$ exceeds $+90°$ the difference of angle ($\theta_1-\theta_2$) exceeds $+90°$, so that the polarity of the cosine signal $\cos(\theta_1-\theta_2)$ is changed from a positive to a negative state. At this moment, the polarity of the sinusoidal signal $\sin(\theta_1-\theta_2)$ is positive, and the contents of the counter circuit 47 is 0. The pulse generator 46 therefore memorizes the positive polarity of the sinusoidal signal $\sin(\theta_1-\theta_2)$ and outputs increment pulse P1 to increment the contents of the counter circuit 47 from 0 to $+1$. As a result, the sample and hold circuit 38, which has outputted the sinusoidal signal $\sin(\theta_1-\theta_2)$ intactly (sample mode) until then, holds and outputs (hold mode) the value $\sin(+90°)$. And when the steering angle $\theta_1$ exceeds $+270°$, the difference of angle ($\theta_1-\theta_2$) also exceeds $+270°$, so that the polarity of the cosine signal $\cos(\theta_1-\theta_2)$ is changed from a negative to a positive state. At this moment, the polarity of the sinusoidal signal $\sin(\theta_1-\theta_2)$ is negative, and the pulse generating circuit 46 compares this polarity with the polarity of the signal $\sin(\theta_1-\theta_2)$ precedingly stored thereinto. The polarity precedingly stored is positive and the present polarity is negative, so that the pulse generating circuit 46 stores the present polarity thereinto and outputs the same kind of pulse signal (increment pulse P1) as that previously outputted therefrom. As a result, the count value of the counter circuit 47 is incremented from $+1$ to $+2$. The resultant count value of the counter circuit 47 is not 0, so that the sample and hold circuit 38 continues to output the value $\sin(+90°)$. When the steering angle $\theta_1$ becomes $+300°$, the follow-up operation is commenced, so that the follow-up angle $\theta_2$ begins to increase, thereby the difference of angle ($\theta_1-\theta_2$) being decreased. And when the difference of angle ($\theta_1-\theta_2$) becomes less than $+270°$, the polarity of the cosine signal $\cos(\theta_1-\theta_2)$ is changed from a positive to a negative state. At this time, the polarity of the sinusoidal signal $\sin(\theta_1-\theta_2)$ is negative, so that the pulse generating circuit 46 stores the present polarity of the signal $\sin(\theta_1-\theta_2)$ and outputs a pulse signal (decrement pulse P2) which is of the kind different from that of the pulse signal precedingly outputted therefrom. As a result, the count value of the counter circuit 47 is decremented from $+2$ to $+1$. The sample and hold circuit 38 therefore continues to output the value $\sin(+90°)$. When the difference of angle ($\theta_1-\theta_2$) is decreased to less than $+90°$, the polarity of the cosine signal $\cos(\theta_1-\theta_2)$ is changed from a negative to a positive state. The polarity of the sinusoidal signal $\sin(\theta_1-\theta_2)$ at this time is positive and the polarity of the signal $\sin(\theta_1-\theta_2)$ precedingly stored is negative, the pulse generating circuit 46 therefore outputs the same kind of pulse signal (decrement pulse P2) as that precedingly outputted therefrom. As a result, the count value of the counter circuit 47 is decreased from $+1$ to 0, so that the sample and hold circuit 38 is released from its hold mode and outputs the sinusoidal signal $\sin(\theta_1-\theta_2)$ intactly (sample mode). And when the difference of angle ($\theta_1-\theta_2$) reaches 0, the follow-up operation is completed.

With the construction of the above-described system, even when the difference of angle ($\theta_1-\theta_2$) is varied in any way, for example, even when the difference of angle ($\theta_1-\theta_2$) exceeds $+360°$, the rotary housing 2 is controlled to rotate in unison with the steering handle in the direction of rotation thereof. And if the counting capacity of the counter circuit 47 is increased, the rotary housing 2 can be controlled to rotate a plurality of revolutions in unison with the steering handle. The system may also be modified by setting the counting capacity to an appropriate value so as to restrict the maximum number of its revolutions to a specific value. In addition, the ratio of the steering angle $\theta_1$ to the follow-up angle $\theta_2$ is not limited to 1:1 but can be changed to 1:n or n:1 to enhance the accuracy of the operation. Further, the construction for effecting the counting operation at the counter circuit 47 may be modified so that the polarity of the cosine signal $\cos(\theta_1-\theta_2)$ immediately after a change of the polarity of the same is compared with that of the sinusoidal signal $\sin(\theta_1-\theta_2)$ to decide which pulse should be generated an increment pulse or a decrement pulse. In this case, the pulse generating circuit 46 is modified so that it outputs a decrement pulse to the counter circuit 47 to decrement its contents by one when the two polarities coincide with each other and that the circuit 46 outputs an increment pulse to the counter circuit 47 to increment its contents by one when the two polarities are different from each other.

APPLICABILITY TO INDUSTRIES

The rotation control system according to the present invention is particularly suitable for controlling the rotation of a rotary housing mounting a propeller unit of a Z-type propulsion apparatus mounted on a vessel such as a tug boat which is required to be steered in a rapid manner and to make a small turn.

What is claimed is:

1. A system for controlling the rotation of a rotary housing of a Z-type propulsion apparatus comprising:
steering angle detecting means for detecting as a steering angle an angular position of a steering handle for commanding said rotary housing to rotate;

follow-up angle detection means for detecting as a follow-up angle an angular position of said rotary housing;

a vector calculation circuit responsive to outputs of said steering angle detection means and follow-up angle detection means for outputting a first sinusoidal signal representative of a sine of the difference of angle between said steering angle of said steering handle and said follow-up angle of said rotary housing, a cosine signal representative of a cosine of said difference of angle and a second sinusoidal signal representative of a sine of an angle obtained by adding +45° to said difference of angle;

a signal processing circuit responsive to said first and second sinusoidal signals and said cosine signal for outputting a positive constant value when said difference of angle, which varies within −360° and +360°, is greater than +180° and when said second sinusoidal signal is negative, said signal processing circuit outputting a negative constant value when said difference of angle is less than −180° and when said second sinusoidal signal is negative, said signal processing circuit outputting said first sinusoidal signal when said difference of angle is between −180° and +180° or when said second sinusoidal signal is greater than or equal to 0; and drive means responsive to output of said signal processing circuit for rotating said rotary housing.

2. A system for controlling the rotation of a rotary housing according to claim 1, in which said steering angle detection means and said follow-up angle detection means comprise potentiometers.

3. A system for controlling the rotation of a rotary housing of a Z-type propulsion apparatus comprising:

steering angle detecting means for detecting as a steering angle an angular position of a steering handle for commanding said rotary housing to rotate;

follow-up angle detection means for detecting as a follow-up angle an angular position of said rotary housing;

a vector calculation circuit responsive to outputs of said steering angle detection means and follow-up angle detection means for outputting a sinusoidal signal representative of a sine of the difference of angle between said steering angle of said steering handle and said follow-up angle of said rotary housing and a cosine signal representative of a cosine of said difference of angle;

a signal processing circuit responsive to said sinusoidal and cosine signals for outputting said sinusoidal signal when said cosine signal is greater than a predetermined value, said signal processing circuit outputting a positive constant value when said difference of angle is positive and when said cosine signal is less than said predetermined value, said signal processing circuit outputting a negative constant value when said difference of angle is negative and when said cosine signal is less than said predetermined value; and drive means responsive to output of said signal processing circuit for rotating said rotary housing.

4. A system for controlling the rotation of a rotary housing according to claim 3, in which said signal processing circuit holds and outputs the value of the sinusoidal signal obtained at the moment when said cosine signal becomes less than said predetermined value if said cosine signal is less than said predetermined value.

5. A system for controlling the rotation of a rotary housing according to claim 4, in which said signal processing circuit further comprises means for comparing the value of said sinusoidal signal held by itself with said sinusoidal signal outputted from said vector calculation circuit to release the holding of the value of said sinusoidal signal when the polarity of said value and the polarity of said sinusoidal signal outputted from said vector calculation circuit coincide with each other and when said cosine signal becomes greater than said predetermined value.

6. A system for controlling the rotation of a rotary housing according to claim 4, in which said signal processing circuit further comprises means for comparing the value of said sinusoidal signal held by itself with said sinusoidal signal outputted from said vector calculation circuit to release the holding of the value of said sinusoidal signal when said cosine signal becomes greater than said predetermined value and when the difference between said value and said sinusoidal signal outputted from said vector calculating circuit is less than a second predetermined value.

7. A system for controlling the rotation of a rotary housing according to claim 4, in which said signal processing circuit comprises:

counter means for performing one of incremental and decremental counting operations which is identical to the preceding counting operation each time the polarity of said cosine signal is changed and when the polarity of said sinusoidal signal at the time of changing of the polarity of said cosine signal is different from the polarity of said sinusoidal signal at the time of the preceding changing of the polarity of said cosine signal, the initial count value of said incremental and decremental counting operations being 0, said counter means performing one of said incremental and decremental counting operations which is of the kind different from that of the preceding counting operation each time the polarity of said cosine signal is changed and when the polarity of said sinusoidal signal at the time of changing of the polarity of said cosine signal is identical to the polarity of said sinusoidal signal at the time of the preceding changing of the polarity of said cosine signal; and signal hold means for outputting said sinusoidal signal to said drive means when the count value outputted from said counter means is 0 and for holding and outputting the value of said sinusoidal signal obtained at the moment when said count value becomes other than 0 if said count value is other than 0.

8. A system for controlling the rotation of a rotary housing according to claim 3, in which said steering angle detection means and said follow-up angle detection means comprise potentiometers.

9. A system for controlling the rotation of a a rotary housing according to claim 4, in which said steering angle detection means and said follow-up angle detection means comprise potentiometers.

10. A system for controlling the rotation of a rotary housing according to claim 5, in which said steering angle detection means and said follow-up angle detection means comprise potentiometers.

11. A system for controlling the rotation of a rotary housing according to claim 6, in which said steering angle detection means and said follow-up angle detection means comprise potentiometers.

12. A system for controlling the rotation of a rotary housing according to claim 7, in which said steering angle detection means and said follow-up angle detection means comprise potentiometers.

* * * * *